(12) United States Patent
Belzile et al.

(10) Patent No.: US 8,545,212 B2
(45) Date of Patent: *Oct. 1, 2013

(54) MOLD-TOOL SYSTEM HAVING MELT SPLITTING DEVICE INCLUDING UNINTERRUPTED MELT CHANNELS EXTENDING FROM INLET AND OUTLETS

(75) Inventors: Manon Danielle Belzile, Fairfield, VT (US); Darrin Albert MacLeod, Jeffersonville, VT (US)

(73) Assignee: Husky Injetion Molding Systems Ltd., Bolton, Ontario (CA)

( * ) Notice: Subject to any disclaimer, the term of this patent is extended or adjusted under 35 U.S.C. 154(b) by 31 days.

This patent is subject to a terminal disclaimer.

(21) Appl. No.: 13/358,088

(22) Filed: Jan. 25, 2012

(65) Prior Publication Data
US 2012/0156324 A1    Jun. 21, 2012

Related U.S. Application Data

(63) Continuation-in-part of application No. 12/913,800, filed on Oct. 28, 2010, now Pat. No. 8,167,609.

(60) Provisional application No. 61/392,502, filed on Oct. 13, 2010, provisional application No. 61/267,581, filed on Dec. 8, 2009.

(51) Int. Cl.
*B29C 45/22* (2006.01)

(52) U.S. Cl.
USPC ............................ 425/572; 264/328.8

(58) Field of Classification Search
USPC ............................ 425/549, 572; 264/328.8
See application file for complete search history.

(56) References Cited

U.S. PATENT DOCUMENTS

| | | |
|---|---|---|
| 4,965,028 A | 10/1990 | Maus et al. |
| 5,683,731 A | 11/1997 | Deardurff et al. |
| 6,149,423 A | 11/2000 | Manz |
| 6,350,401 B1 | 2/2002 | Gellert et al. |
| 2009/0117219 A1 | 5/2009 | Fischer et al. |
| 2009/0236774 A1 | 9/2009 | Blais et al. |
| 2010/0310694 A1 | 12/2010 | Niewels et al. |

OTHER PUBLICATIONS

Mold Masters Pamphlet entitled "Your Connection! . . . To Injection Molding Excellence: Modular Manifolds & Master-Probe Nozzle Probes", Apr. 1986, pp. 1-40.*

* cited by examiner

*Primary Examiner* — Tim Heitbrink

(57) ABSTRACT

A mold-tool system is provided which includes a melt distribution device and a melt splitting device configured to interact with the melt distribution device. The melt splitting device includes a single inlet and multiple outlets spaced from the single inlet. The outlets are configured for fluid communication with the melt distribution device. The melt splitting device further includes a plurality of uninterrupted melt channels, where each melt channel extends from the inlet to an associated one of the outlets.

15 Claims, 10 Drawing Sheets

MOLD-TOOL SYSTEM HAVING MELT SPLITTING DEVICE INCLUDING UNINTERRUPTED MELT CHANNELS EXTENDING FROM INLET AND OUTLETS

CROSS-REFERENCE TO RELATED PATENT APPLICATION(S)

This application is a continuation-in-part of co-pending U.S. application Ser. No. 12/913,800 entitled "MOLD-TOOL SYSTEM HAVING MELT SPLITTING DEVICE INCLUDING UNINTERRUPTED MELT CHANNELS EXTENDING FROM INLET AND OUTLETS" filed Oct. 28, 2010, which is herein incorporated by reference in its entirety, which claims the benefit of U.S. Provisional Application Ser. No. 61/392,502 filed on Oct. 13, 2010 and U.S. Provisional Application Ser. No. 61/267,581 filed on Dec. 8, 2009, both of which are herein incorporated by reference in their entirety.

TECHNICAL FIELD

An aspect generally relates to mold-tool systems including a melt splitting device having uninterrupted melt channels extending from the inlet to the outlets.

SUMMARY

The inventors have researched a problem associated with known molding systems that inadvertently manufacture bad-quality molded articles or parts. After much study, the inventors believe they have arrived at an understanding of the problem and its solution, which are stated below, and the inventors believe this understanding is not known to the public.

According to one aspect, a mold-tool system is provided. The mold-tool system includes a melt distribution device and a melt splitting device configured to interact with the melt distribution device. The melt splitting device includes a single inlet and multiple outlets spaced from the single inlet, where the outlets are configured for fluid communication with the melt distribution device. The melt splitting device also includes a plurality of uninterrupted melt channels, where each melt channel extends from the inlet to an associated one of the outlets.

According to another aspect, a mold-tool system is provided. The mold-tool system includes a manifold assembly having a plurality of inlets and a plurality of outlets, where each inlet of the manifold assembly is in communication with an associated outlet through a dedicated, uninterrupted melt channel. The mold-tool system further includes a melt splitting device which includes a single inlet, a plurality of outlets spaced axially from the inlets, and a plurality of uninterrupted melt channels. Each melt channel in the melt splitting device extends from the inlet to an associated one of the outlets to provide a flow of a melt from the inlet to the associated outlet without mixing with melt in other melt channels. Each outlet of the melt splitting device communicates with an associated inlet of the manifold assembly.

According to another aspect, a mold-tool system is provided. The mold-tool system includes a melt splitting device configured to interact with a melt distribution device, and the melt splitting device includes a single inlet having a central axis. The melt splitting device also includes multiple outlets spaced from the single inlet, the outlets being configured for fluid communication with the melt distribution device, and a plurality of uninterrupted melt channels. Each melt channel extends from the inlet to an associated one of the outlets, where the plurality of uninterrupted melt channels radiates symmetrically, radially, outwardly from the central axis of the single inlet.

According to yet another aspect, a mold-tool system is provided. The mold-tool system includes a melt splitting device configured to interact with a melt distribution device, and the melt splitting device includes a single inlet having a central axis. The melt splitting device also includes multiple outlets spaced from the single inlet, the outlets being configured for fluid communication with the melt distribution device, and a plurality of uninterrupted melt channels. Each melt channel extends from the inlet to an associated one of the outlets. The melt splitting device also includes an outlet body which defines at least a portion of the melt channels, the outlet body having an apex, where the apex is positioned substantially along the central axis of the single inlet.

Other aspects and features of the non-limiting embodiments will now become apparent to those skilled in the art upon review of the following detailed description of the non-limiting embodiments with the accompanying drawings.

DETAILED DESCRIPTION OF THE DRAWINGS

The non-limiting embodiments will be more fully appreciated by reference to the following detailed description when taken in conjunction with the accompanying drawings, in which.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE NON-LIMITING EMBODIMENT(S)

Figure 1:
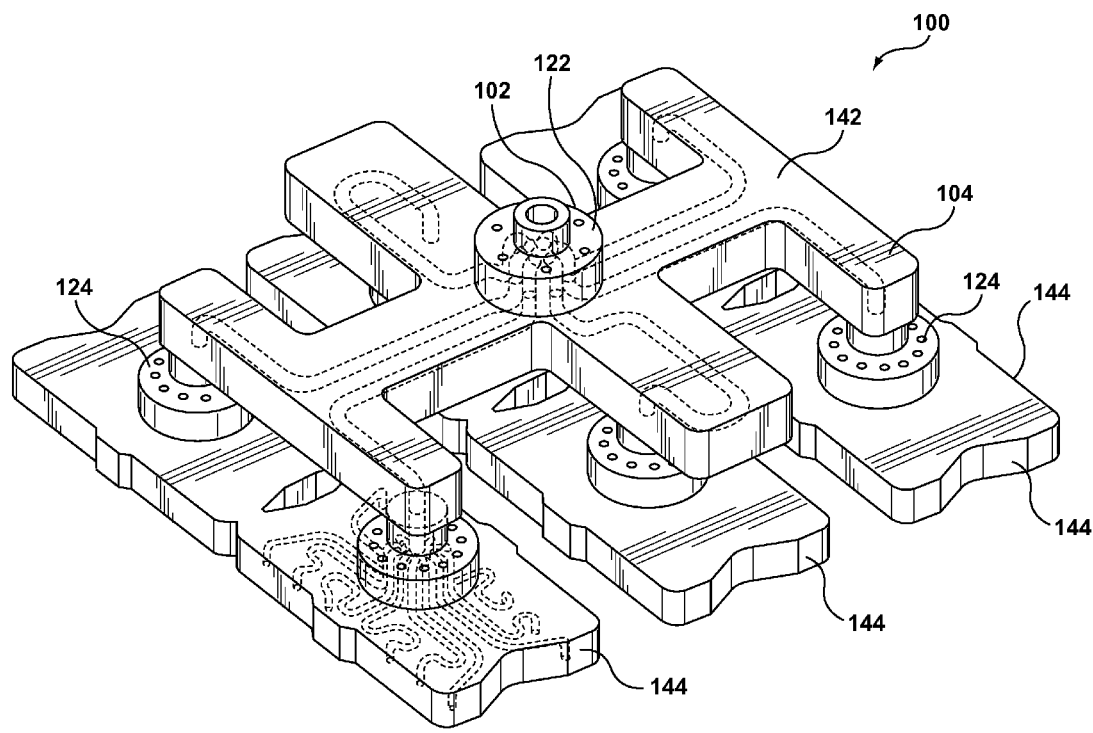
FIG. 1 is a schematic representation of one embodiment of a mold-tool system with a melt splitting device.

FIG. 1 is a the schematic representation of a mold-tool system (100). The mold-tool system (100) may include components that are known to persons skilled in the art, and these known components will not be described here; these known components are described, at least in part, in the following reference books (for example): (i) "*Injection Molding Handbook*" authored by OSSWALD/TURNG/GRAMANN (ISBN: 3-446-21669-2), (ii) "*Injection Molding Handbook*" authored by ROSATO AND ROSATO (ISBN: 0-412-99381-3), (iii) "*Injection Molding Systems*" $3^{rd}$ Edition authored by JOHANNABER (ISBN 3-446-17733-7) and/or (iv) "*Runner and Gating Design Handbook*" authored by BEAUMONT (ISBN 1-446-22672-9). It will be appreciated that for the purposes of this document, the phrase "includes (but is not limited to)" is equivalent to the word "comprising". The word "comprising" is a transitional phrase that links the preamble of a patent claim to the specific elements set forth in the claim which define the invention.

The mold-tool system (100) may be implemented as a hot runner system or may be implemented as a cold runner system. The mold-tool system (100) is a system that is supported by a platen assembly (known but not depicted) of a molding system (known and not depicted), such as an injection molding system.

FIG. 1 is a perspective view of one embodiment of the mold-tool system (100). The mold-tool system (100) may include (and is not limited to): a melt splitting device (102). In the embodiment illustrated in FIG. 1, the melt splitting device (102) includes (and is not limited to): an upper melt splitting device (122), and at least one (or a plurality of) lower melt splitting device (124). The mold-tool system (100) may also include (and is not limited to): a manifold assembly (104). The manifold assembly (104) may include (and is not limited to): a cross manifold assembly (142), and a plurality of main manifold assemblies (144). The upper melt splitting device (122) is configured for connection with a melt preparation device, such as (for example) an injection unit (known and not depicted) of an injection molding system (known and not depicted). The upper melt splitting device (122) may be connected with the cross manifold assembly (142). The plurality of lower melt splitting devices (124) may connect the cross manifold assembly (142) with a respective one of the main manifold assemblies (144). It will be appreciated that the mold-tool system (100) as depicted in FIG. 1 is an example (for illustration purposes).

Figure 2:
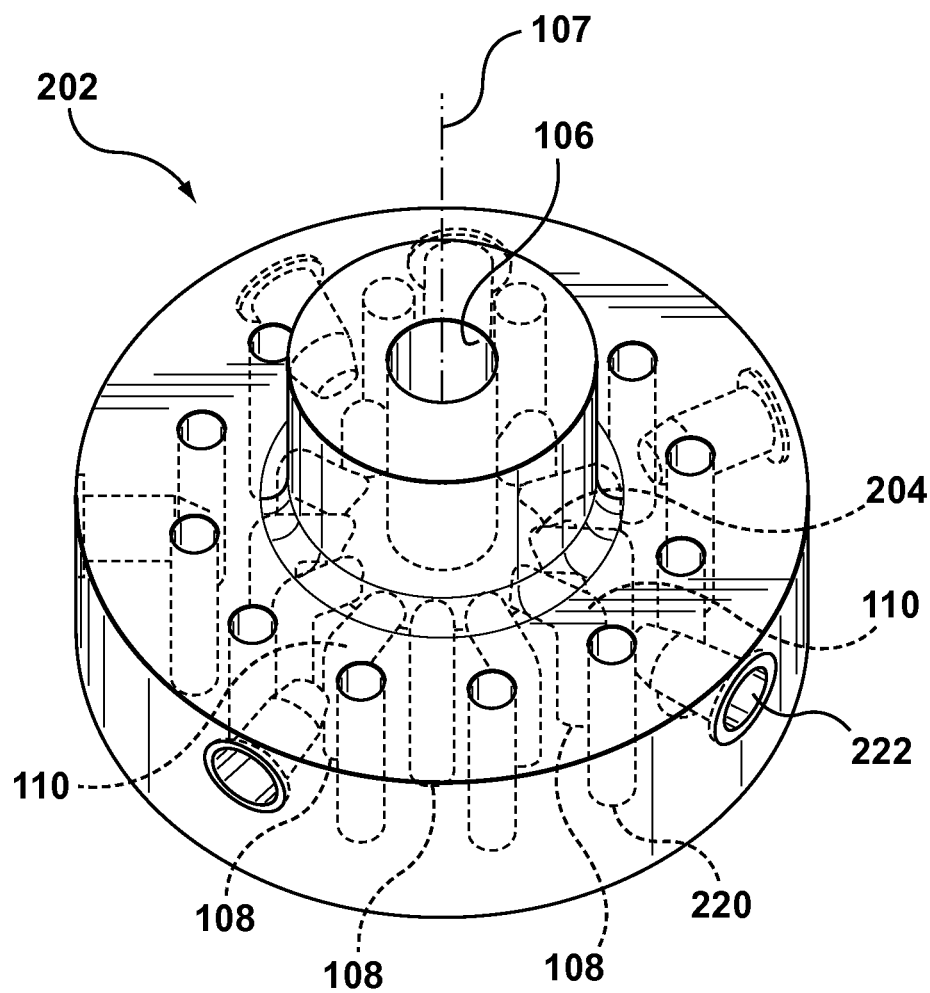
FIG. 2 is a schematic representation of one embodiment of a melt splitting device.

FIG. 2 is a perspective view of one embodiment of a melt splitting device (202). In the embodiment, the melt splitting device (202) is configured to interact with a melt distribution device. By way of example, the melt distribution device may include (and is not limited to) a manifold assembly (104) as shown in FIG. 1. The melt splitting device (202) may have (and is not limited to): (i) a single inlet (106), (ii) multiple outlets (108) that are spaced from the single inlet (106), and (iii) uninterrupted melt channels (110). Each melt channel (110) extends without interruption from the single inlet (106) to an associated one of the outlets (108). The outlets (108) are configured for fluid communication with the melt distribution device, such as the manifold assembly (104). The melt splitting device (202) may be, for example, connected to hoses or other types of channels.

There are no melt-channel intersections between the melt channels (110) so that there is no mixing or flow of a melt (resin) between the melt channels (110); that is, there is no inter-channel mixing between the melt channels (110). The melt channels (110) have no breaks so as to avoid causing a split (or a branching) in the flow of a melt flowing along the melt channels (110). A technical effect of the foregoing is that each of the outlets (108) may have similar melt front profiles (that is, thermal profiles). The melt splitting device (102) may be manufactured using additive manufacturing methods (such as 3D printing, etc) or by traditional manufacturing methods (such as gun drilling), etc.

The mold-tool system (100) may, optionally, be arranged such that the melt splitting device (102) includes a material that has a thermal conductivity that is different from the thermal conductivity of a material in the manifold assembly (104), depending on the technical performance that may be required from the melt splitting device (102). The melt splitting device (102) may include a material having a thermal conductivity that is either higher or lower than the thermal conductivity of the material in the manifold assembly (104), depending on a specific requirement. For example, where is it desired to avoid heating the melt splitting device (102), a high thermal conductivity may be used in the material of the melt splitting device (102) relative to the material of the manifold assembly (104). Where it is desired to insulate the resin from excessive heat, the material of the melt splitting device (102) may have a lower thermal conductivity relative to that of the material used in the manifold assembly (104).

The melt splitting device (102) may be made from multiple pieces that are then joined by brazing, welding, bolting, screwing, press fitting, etc.

The mold-tool system (100) optionally, may be arranged such that the melt splitting device (102) includes a material that has a fatigue strength that is different than the fatigue strength of the material included in the manifold assembly (104). A higher fatigue strength material may be used in the melt splitting device (102) where mechanical stresses are expected to be relatively higher. Also, where mechanical stresses may not be an issue, the fatigue strength of the material used in the melt splitting device (102) may be the same as the fatigue strength of the material used in the manifold assembly (104).

FIG. 2 illustrates one embodiment of a melt splitting device (202) which includes a single inlet (106) and multiple outlets (108), and (ii) a melt splitter (204) connecting the single inlet (106) with uninterrupted melt channels (110). Each of the melt channels (110) is connected to a respective outlet (108) without interruption. In this embodiment, the melt splitter (204) is configured such that the melt channels (110) radiate radially outwardly from a direction that is perpendicular to a central axis (107) extending through the inlet (106). The melt splitting device (202) may include connection holes (220) that are configured to permit connection of the melt splitting device (202) to the manifold assembly (104) shown in FIG. 1. The connection hole (220) may accommodate a connection device, such as bolt, etc. A plug (222) may be used to seal and divert the melt flow in the melt channels (110), where the melt channels (110) are gun drilled.

Figure 3:
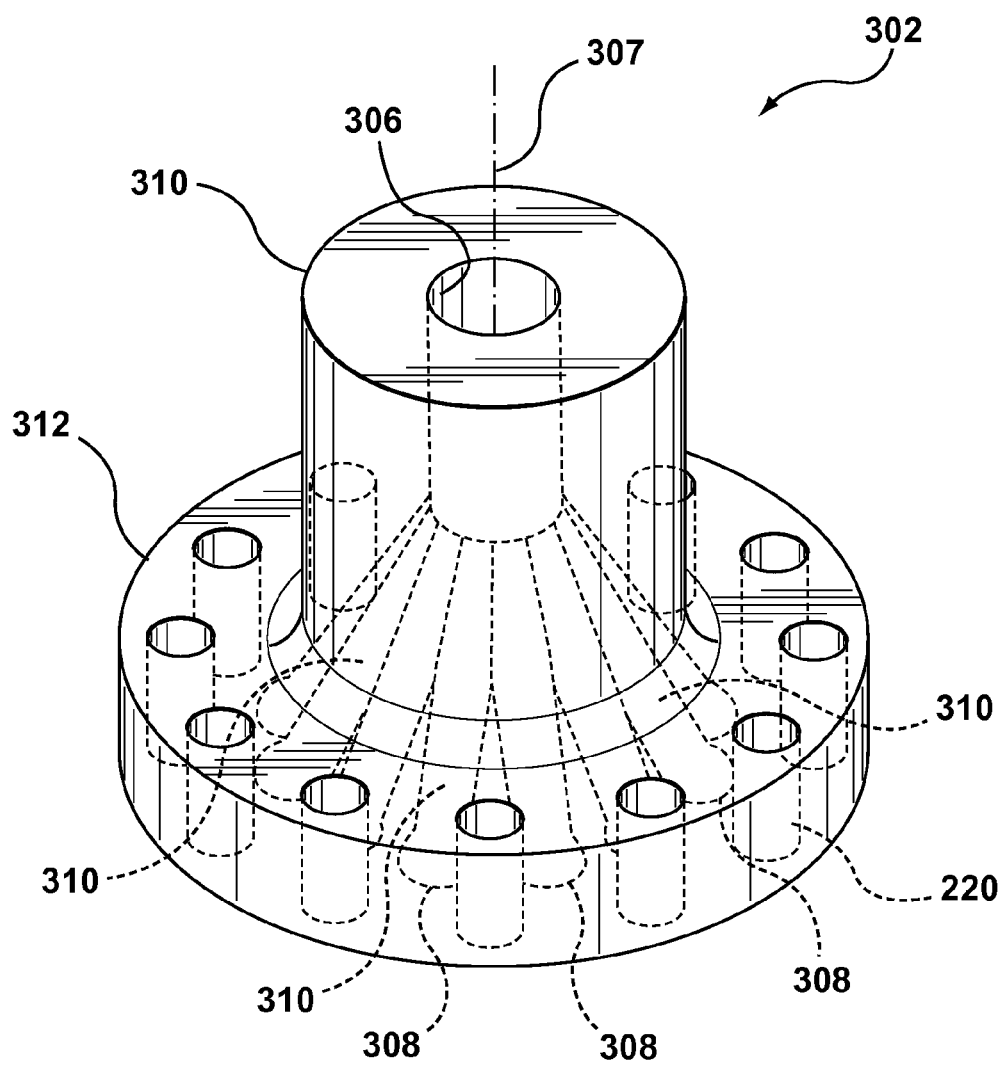
FIG. 3 is a schematic representation of another embodiment of a melt splitting device.

FIG. 3 is a perspective view of another embodiment of a melt splitting device (302) that includes (and is not limited to): (i) an upper body (310), and (ii) a lower body (312). The upper body (310) may include a single inlet (306). The lower body (312) may include uninterrupted melt channels (310) and multiple outlets (308). The melt channels (310) may radiate symmetrically radially outwardly along an acute angle relative to a central axis (307) of the inlet (306).

Figure 4:
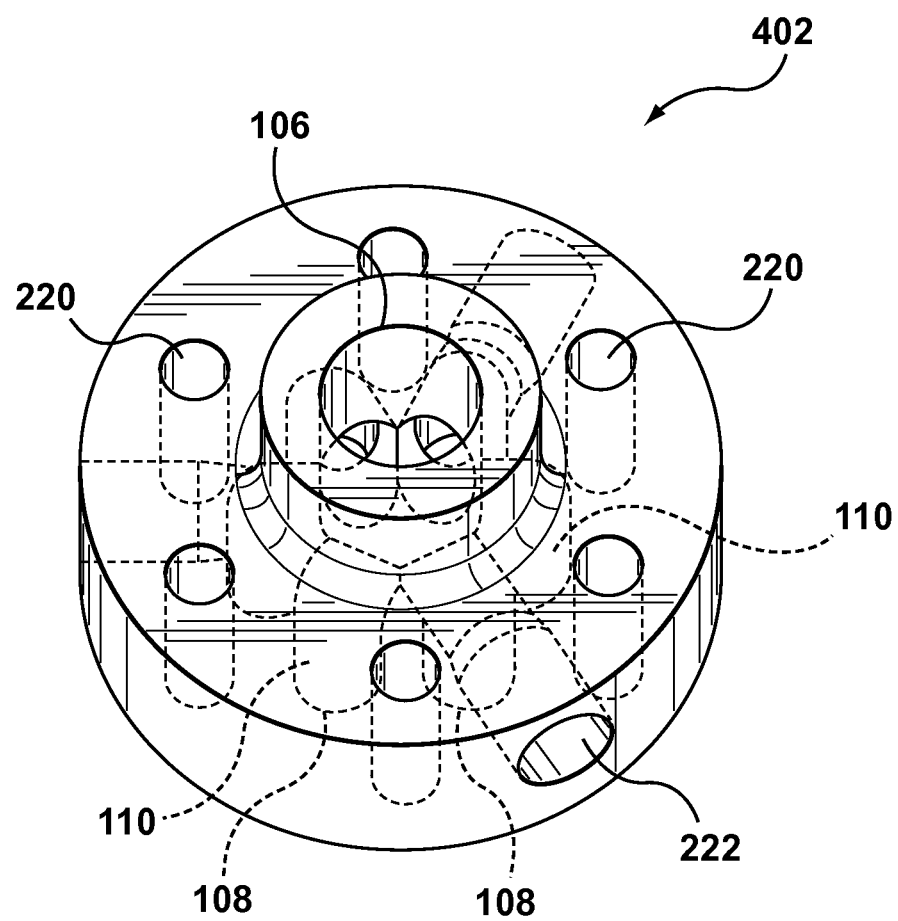
FIG. 4 is a schematic representation of yet another embodiment of a melt splitting device.

FIG. 4 is a perspective view of another embodiment of a melt splitting device (402), which is similar to the embodiment depicted in FIG. 2, and thus, like reference numbers are used, with the difference being that the embodiment shown in FIG. 4 illustrates a six way split, while the embodiment shown in FIG. 2 illustrates a 12 way split.

Figure 5A:
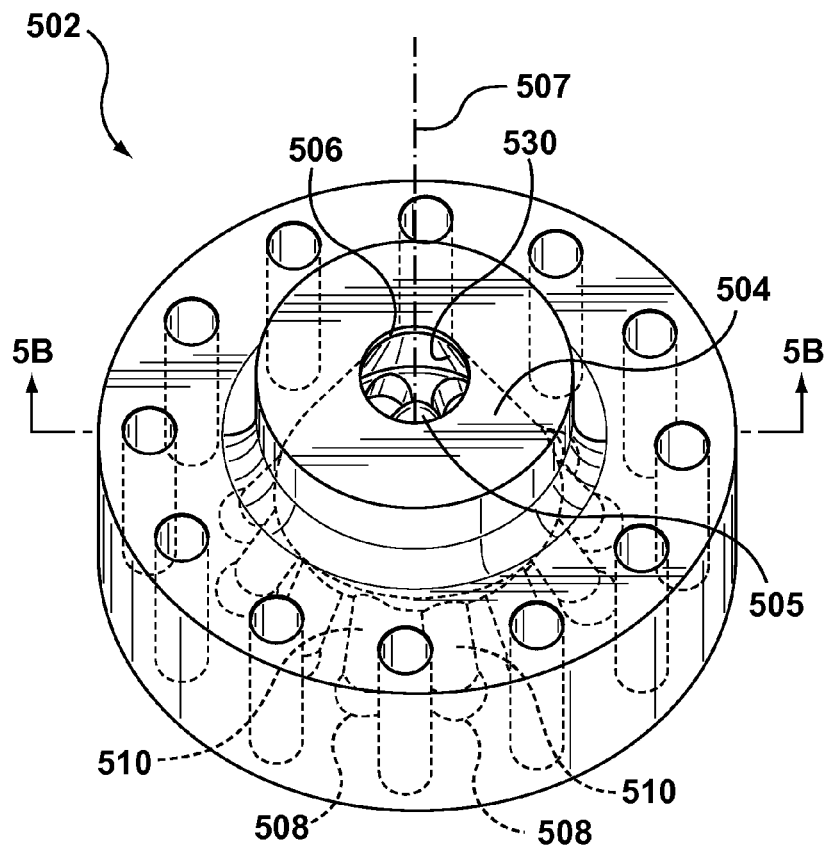
FIG. 5A is a schematic representation of another embodiment of a melt splitting device.
Figure 5B:
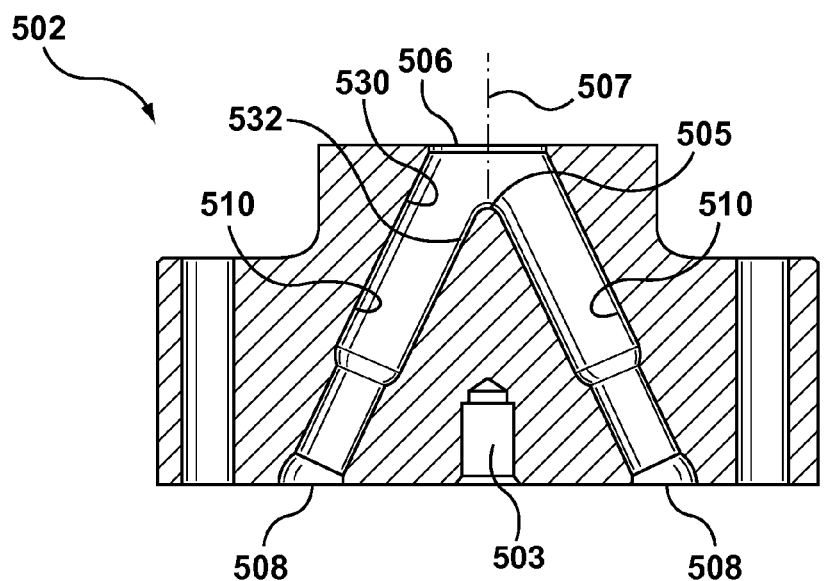
FIG. 5B is a side view of the melt splitting device shown in FIG. 5A.

FIG. 5A is a perspective view of another embodiment of a melt splitting device (502) and FIG. 5B is a cross-sectional view of the melt splitting device (502), in which a substantially conical shaped melt splitter (504) is included within the melt splitting device (502). The conical melt splitter (504) may be formed of a first (or upper) conical surface (530) and a second (or lower) conical surface (532). The second conical surface 532 may include an apex (505) which may be disposed adjacent the inlet (506) and the apex (505) may be aligned with the axis (507). A base of the melt splitting device body (502) may be directed toward the outlets (508). The uninterrupted melt channels (510) may extend outwardly from the apex (505). An alignment dowel (503) may be included in the melt splitting device body (502) to align the melt splitting device (502) with the manifold assembly (104).

The mold-tool system may, optionally, be configured such that the melt splitting device (502) changes direction of a melt flow from a cylindrical flow to an annular flow before the melt flow splits into the outlets (508), as depicted in FIGS. 5B. In particular, Applicant recognized that some of the prior art melt splitting devices do not split the flow symmetrically. Applicant recognized that the temperature of the flow may vary across the cross-section of the inlet (506). For example, the temperature of the flow near the channel wall may be higher due to friction, in comparison to the temperature of the flow near the center of the channel. Some of the prior melt splitting devices split the flow such that some of the warmer flow is split off in one direction into one outlet, and some of the cooler flow goes another direction into another outlet. This may be undesirable.

Applicant further recognized that it may be desirable to split the flow symmetrically. Thus, in one embodiment, the melt splitting device is configured to split the flow substantially symmetrically. As set forth below, in one embodiment, the melt splitting device is configured to split the flow into substantially equal "wedges" such that each melt channel is getting a substantially equal portion of the hotter outside flow and a substantially equal portion of the cooler inside flow. Thus, in one embodiment, each of the outlets may have a substantially equal thermal profile across the cross-section of the flow.

Figure 6A:
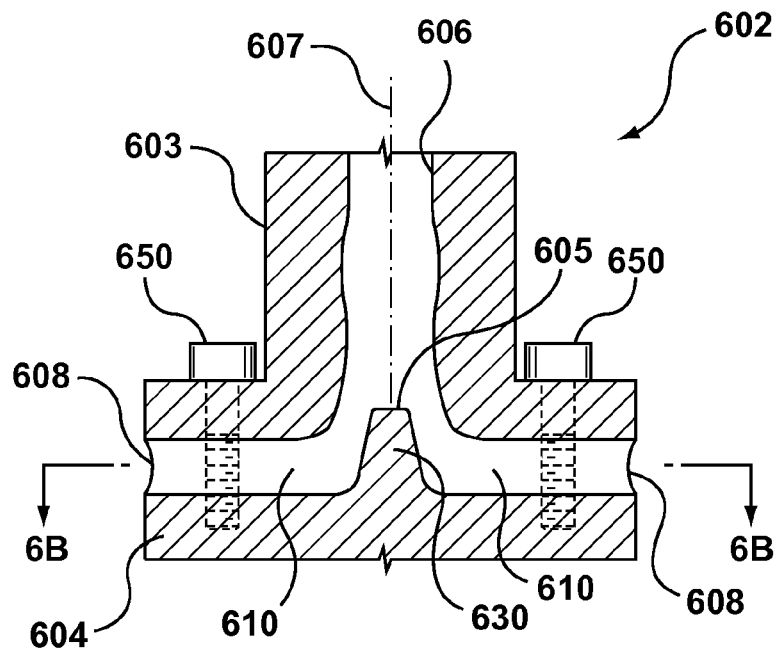
FIG. 6A is a side view of another embodiment of a melt splitting device.
Figure 6B:
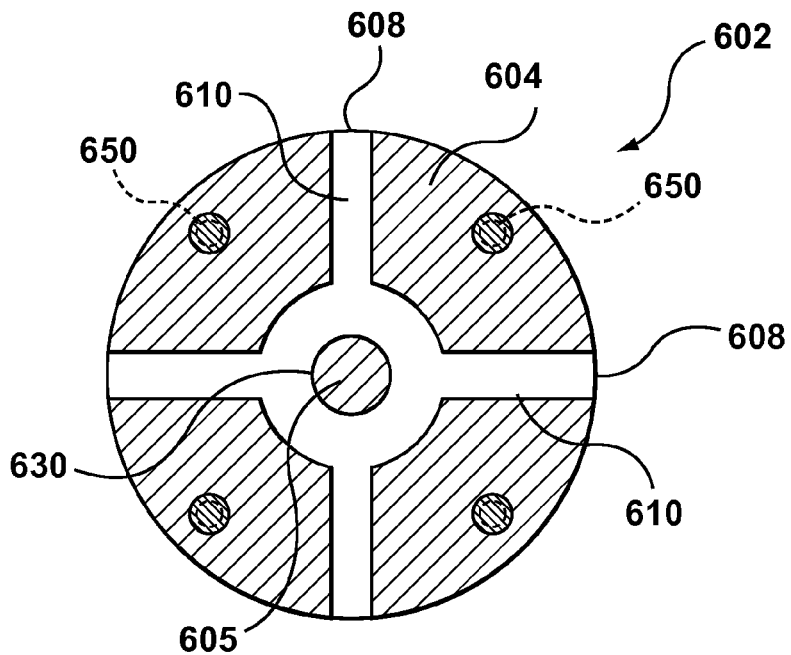
FIG. 6B is a sectional view of the melt splitting device shown in FIG. 6A taken along line A-A.

FIG. 6A is a perspective view of another embodiment of a melt splitting device (602), in which the melt splitting device (602) may be formed of multiple pieces or components. FIG. 6B is a cross-sectional view (along section 6B-6B) of the melt-splitting device (602) shown in FIG. 6A. The melt splitting device (602) may include an inlet body (603) that includes a single inlet (606), and may also include an outlet body (604) that includes uninterrupted melt channels (610) and multiple outlets (608). One or more connectors (650) may be used for connecting the inlet body (603) with the outlet body (604). Generally, the inlet body (603) and the outlet body (604) are configured to be securely sealably connected together. As illustrated in FIG. 6A, in one embodiment, the outlet body (604) includes at least a portion of the melt channels (610) and the outlet body (604) has a melt splitter (630) with an apex (605), where the apex (605) is positioned substantially along the central axis (607) of the inlet (606). It is contemplated that positioning the apex (605) of the melt splitter (630) along the central axis (607) of the inlet (606) allows the flow to be distributed substantially equally among the melt channels.

Figure 7A:
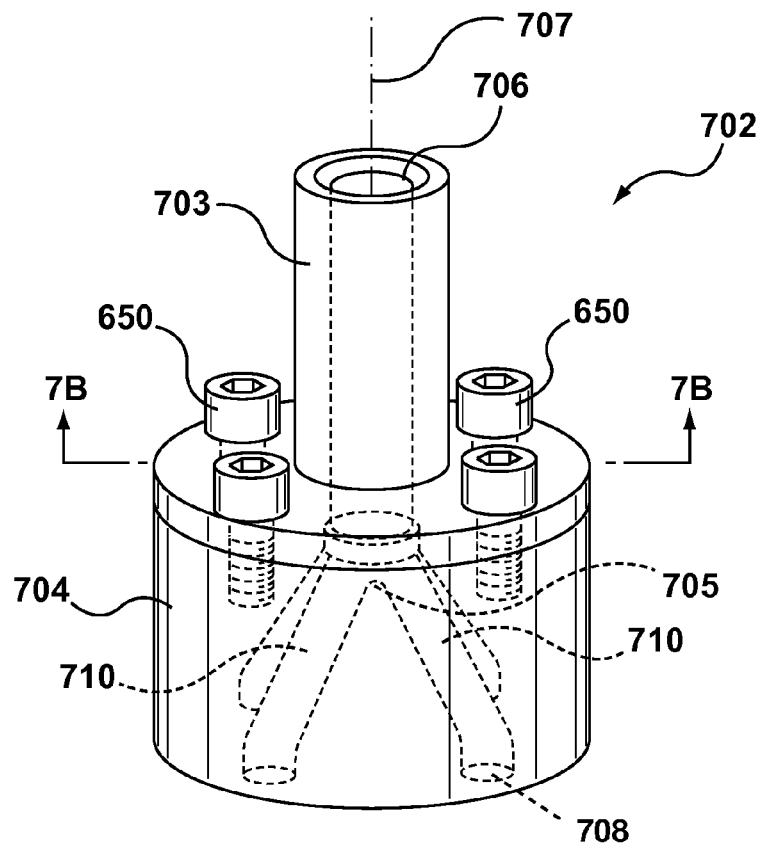
FIG. 7A is a schematic representation of another embodiment of a melt splitting device.
Figure 7B:
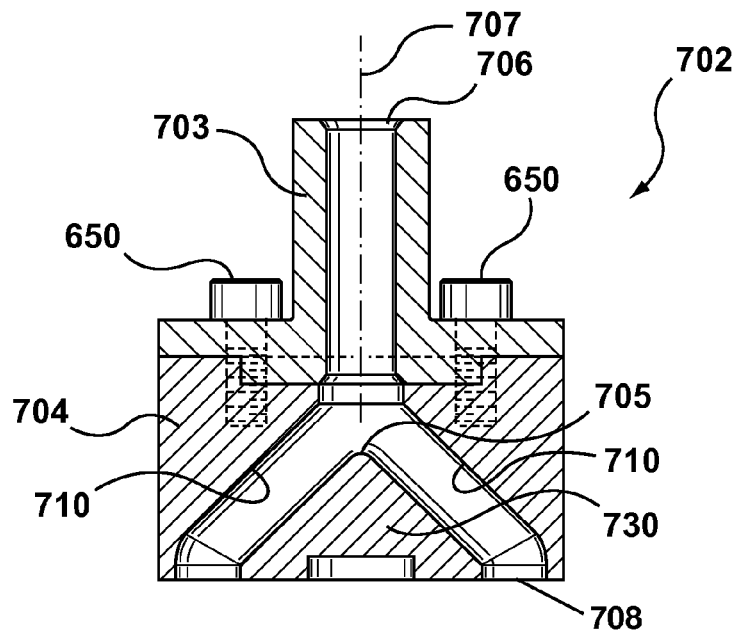
FIG. 7B is a sectional view of the melt splitting device shown in FIG. 7A.

FIG. 7A is a perspective view of another embodiment of a melt splitting device (702), and FIG. 7B is a cross-sectional view (along section 7B-7B) of the melt splitting device (702) shown in FIG. 7A, in which the melt splitting device (702) includes multiple pieces. Specifically, the melt splitting device (702) may include (and is not limited to) an inlet body (703) and an outlet body (704). One or more connectors (650) connects the inlet body (703) with the outlet body (704). The outlet body (704) may include the uninterrupted melt channels (710) and the multiple outlets (708). The inlet body (703) may include the single inlet (706). As illustrated in FIG. 7A, in one embodiment, the outlet body (704) includes at least a portion of the melt channels (710) and the outlet body (704) has a melt splitter (730) with an apex (705), where the apex (705) is positioned substantially along the central axis (707) of the single inlet. It is contemplated that positioning the apex (706) of the melt splitter (730) along the central axis (707) of the inlet (706) allows the flow to be distributed substantially equally between the melt channels. As illustrated in FIG. 7A, in one embodiment, the melt splitter (730) is substantially conically shaped. In contrast, as illustrated in FIG. 6A, in another embodiment, the melt splitter (630) is formed as a substantially truncated conical structure.

Figure 8:
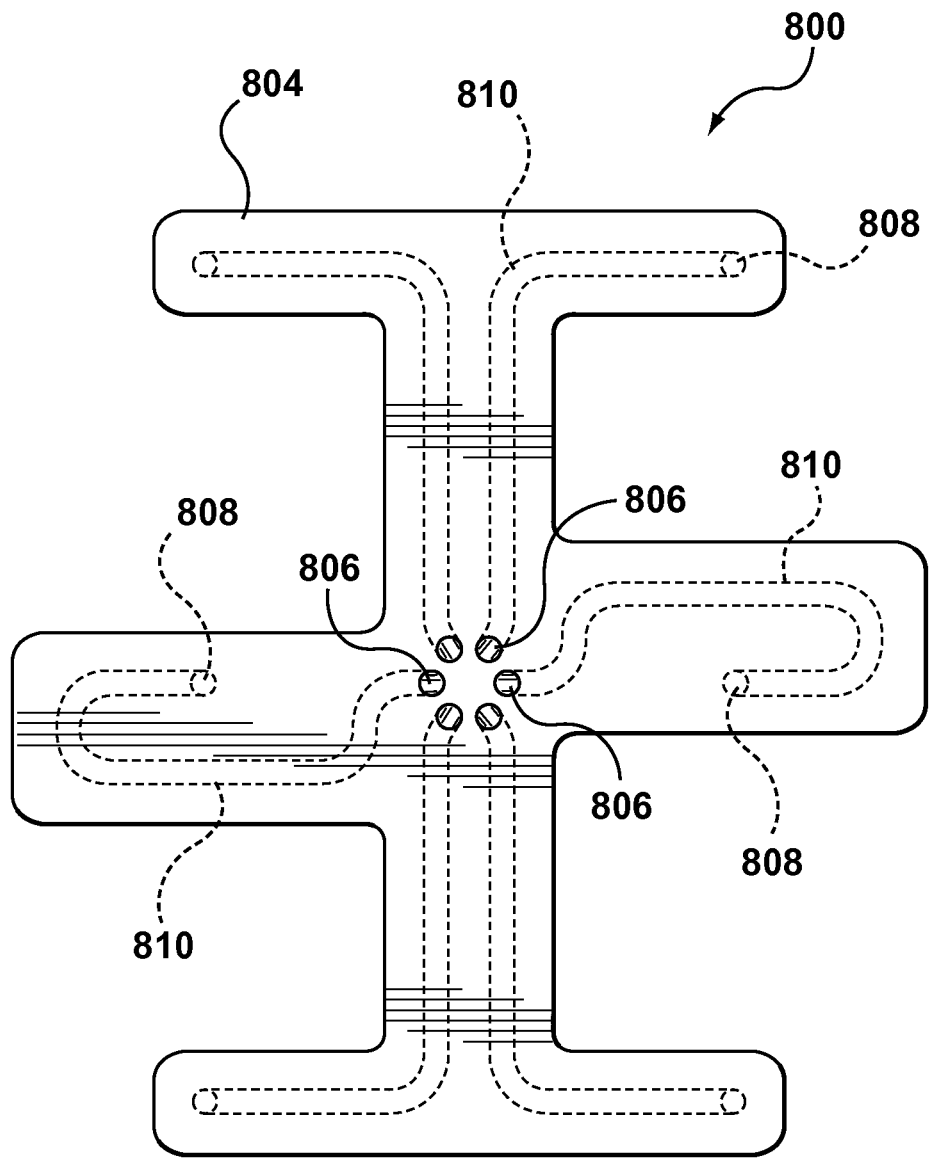
FIG. 8 is a schematic representation of another embodiment of a mold-tool system with a manifold assembly.

FIG. 8 is a schematic view of another embodiment of the mold-tool system (800), in which the manifold assembly (804) may be configured as a cross manifold assembly (142). The manifold assembly (804) may include a manifold inlet (806), a plurality of manifold outlets (808), and uninterrupted manifold channels (810). The uninterrupted manifold channels (810) may be similar to the uninterrupted melt channels (110).

Figure 9:
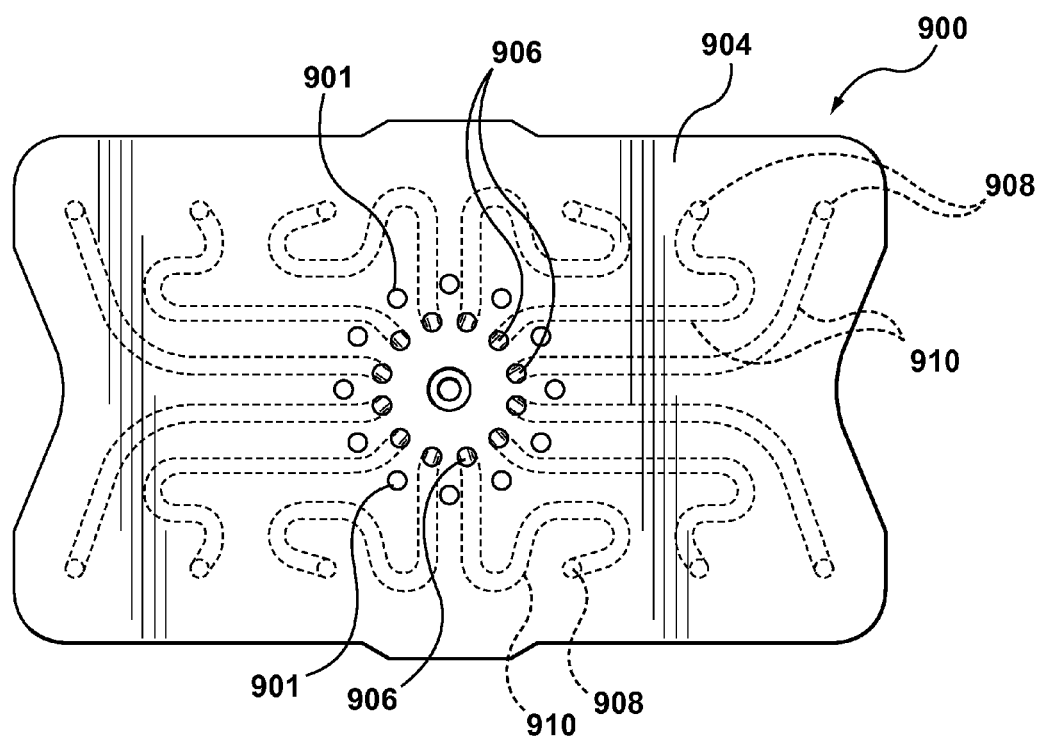
FIG. 9 is a schematic representation of another embodiment of a mold-tool system with a manifold assembly.

FIG. 9 is a schematic view of another embodiment of the mold-tool system (900), in which the manifold assembly (904) may be configured as a main manifold assembly (144) having a main manifold body (902), a manifold inlet (906), a plurality of manifold outlets (908), and uninterrupted melt channels (910). The uninterrupted melt channels (910), may be similar to the uninterrupted melt channels (110). A plurality of connector holes (901) may be provided for permitting connection of the main manifold body (900) to other components, such as a melt splitting device.

Figure 10:
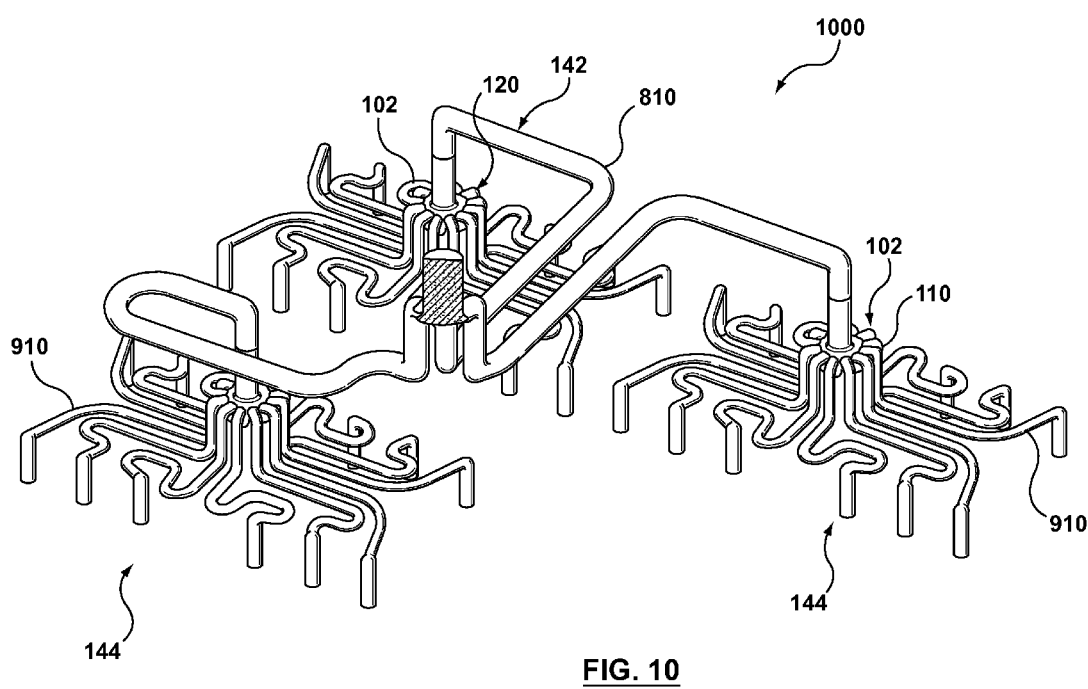
FIG. 10 is a schematic representation of one embodiment of a mold-tool system with a melt splitting device and a manifold assembly.

FIG. 10 is a schematic representation of one embodiment of a mold-tool system (1000), showing the uninterrupted melt channels (110) in the melt splitting device (102), the uninterrupted manifold channels (810) in the cross manifold assembly (142) and the uninterrupted melt channels (910) in the main manifold assembly (144) without any surrounding structure.

It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood, for the purposes of this document, the phrase "includes (and is not limited to)" is equivalent to the word "comprising". It is noted that the foregoing has outlined the non-limiting embodiments (examples). The description is made for particular non-limiting embodiments (examples). It is understood that the non-limiting embodiments are merely illustrative as examples.

What is claimed is:

1. A mold-tool system, comprising:
   a melt distribution device;
   a melt splitting device configured to interact with the melt distribution device, the melt splitting device comprising:
   a single inlet;
   multiple outlets spaced from the single inlet, the outlets being configured for fluid communication with the melt distribution device;
   a plurality of uninterrupted melt channels, each melt channel extending from the inlet to an associated one of the outlets; and a melt splitting device body having a substantially cone-shaped melt splitter communicating with the inlet for splitting the melt and directing the melt to the uninterrupted melt channels.

2. The mold-tool system of claim 1, wherein:
the melt distribution device includes a manifold assembly.

3. The mold-tool system of claim 2, wherein:
the melt splitting device includes a material that has a thermal conductivity that is different from a thermal conductivity of a material included in the manifold assembly.

4. The mold-tool system of claim 2, wherein:
the melt splitting device includes a material that has a fatigue strength that is different than a fatigue strength of a material included in the manifold assembly.

5. The mold-tool system of claim 1, wherein:
the melt splitting device is configured to change direction of a melt flow from a cylindrical flow to an annular flow before the melt flow enters the melt channels.

6. The mold-tool system of claim 1, wherein each of the outlets has a similar melt flow front profile.

7. The mold-tool system of claim 1, wherein the melt channels radiate symmetrically, radially, outwardly along an acute angle relative to a central axis of the inlet.

8. The mold-tool system of claim 1, wherein the melt splitting device includes an upper body that includes the inlet, and a lower body that includes the melt channels and the outlets.

9. A mold-tool system comprising:
a manifold assembly having a plurality of inlets and a plurality of outlets, each inlet of the manifold assembly being in communication with an associated outlet through a dedicated, uninterrupted melt channel;
a melt splitting device, the melt splitting device comprising:
a single inlet;
a plurality of outlets spaced axially from the inlets;
a plurality of uninterrupted melt channels, each melt channel in the melt splitting device extending from the inlet to an associated one of the outlets to provide a flow of a melt from the inlet to the associated outlet without mixing with melt in other melt channels; and
a melt splitting device body having a substantially cone-shaped melt splitter communicating with the inlet for splitting the melt and directing the melt to the uninterrupted melt channels,
each outlet of the melt splitting device communicating with an associated inlet of the manifold assembly.

10. The mold-tool system of claim 9, further comprising:
a connection hole disposed in the melt splitting device; and
a connection device extending through the connection hole and into the manifold assembly to attach the melt splitting device to the manifold assembly.

11. The mold-tool system of claim 10, further comprising a plug in the melt splitting device to seal and divert melt flow in the melt channels of the melt splitting device.

12. The mold-tool system of claim 9, wherein the melt splitting device comprises six melt channels and six outlets.

13. The mold-tool system of claim 9, wherein the melt splitting device comprises 12 outlets and 12 melt channels.

14. A melt splitting device configured to interact with a melt distribution device, the melt splitting device comprising:
a single inlet, the single inlet having a central axis;
multiple outlets spaced from the single inlet, the outlets being configured for fluid communication with the melt distribution device;
a plurality of uninterrupted melt channels, each melt channel extending from the inlet to an associated one of the outlets, wherein the plurality of uninterrupted melt channels radiates symmetrically, radially, outwardly from the central axis of the single inlet; and
a melt splitting device body having a substantially cone-shaped melt splitter communicating with the inlet for splitting the melt and directing the melt to the uninterrupted melt channels.

15. A mold-tool system, comprising:
a melt splitting device configured to interact with a melt distribution device, the melt splitting device comprising:
a single inlet, the single inlet having a central axis;
multiple outlets spaced from the single inlet, the outlets being configured for fluid communication with the melt distribution device;
a plurality of uninterrupted melt channels, each melt channel extending from the inlet to an associated one of the outlets; and
an outlet body which defines at least a portion of the melt channels, the outlet body having an apex, wherein the apex is positioned substantially along the central axis of the single inlet.

* * * * *